Feb. 11, 1941.   F. LEHRE   2,231,130
SELF-LOCKING NUT
Filed Sept. 6, 1938
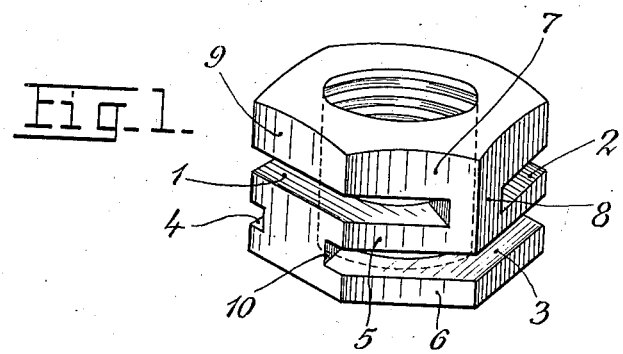
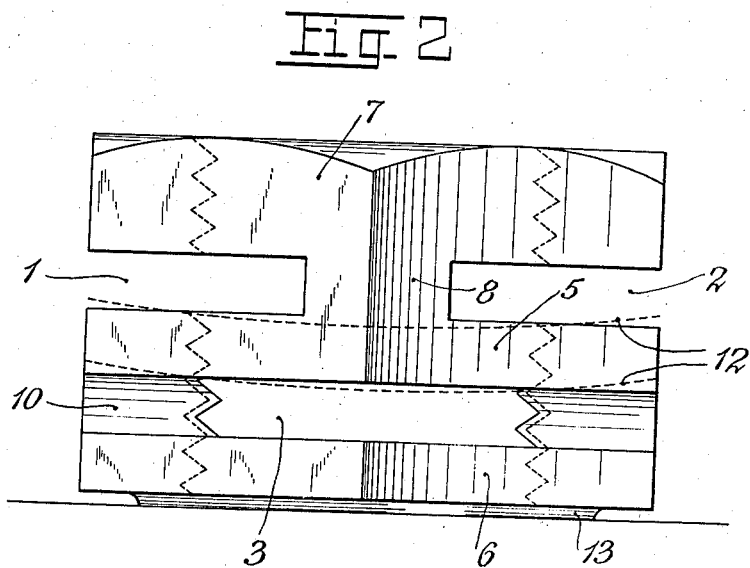

Patented Feb. 11, 1941

2,231,130

UNITED STATES PATENT OFFICE 2,231,130

SELF-LOCKING NUT

Frithjof Lehre, Oslo, Norway

Application September 6, 1938, Serial No. 228,629
In Norway September 28, 1937

2 Claims. (Cl. 151—21)

This invention relates to a self-locking nut made in one piece, the nut being divided by means of two sets of cuts or incisions displaced at right angles with regard to each other into three sections, the middle section being connected with the upper and lower sections by means of two diametrically opposed connection members, so that the connection members on the upper and lower side are also displaced at right angles with regard to each other.

During the tightening of the nut the middle section of the same will then be exposed to a bending stress and the threads of this middle section will be so deformed that they will elastically engage alternately the upper and lower surfaces of the bolt threads, whereby loosening of the nut owing to shocks transmitted in the axial direction of the bolt or nut will be largely avoided.

On the accompanying drawing Fig. 1 is a perspective view of the self-locking nut in accordance with the invention.

Fig. 2 is a side view of the nut on a larger scale.

Referring to Figures 1 and 2 the nut is provided with two sets of opposed cuts 1, 2 and 3, 4, by means of which it is divided in three more or less disk shaped sections, viz. a middle section 5, a lower section 6 and an upper section 7.

The cuts 1, 2 and the cuts 3, 4 are displaced at right angles with regard to each other, so that the connection between the middle section 5 and the upper and lower sections 7, 6 respectively is formed by means of members 8, 10, which extend from the middle section 5 at two diametrically opposed points on the underside thereof and two diametrically opposed points at the upper side thereof, these two pairs of points being displaced at right angles with regard to each other, so that the middle section 5 during the tightening of the nut is exposed to a bending stress so as to be deformed as indicated on an exaggerated scale by the dotted lines 12 on Fig. 2.

On the deformed part of the nut the thread will form a wave line about the normal helical line and will be brought in elastic engagement against the upper as well as against the lower surface of the bolt thread.

This effect is emphasized by providing the lower nut section 6 on its lower side with an annular shoulder 13, surrounding the threaded opening, whereby the deformation of the middle section 5 will be concentrated to a higher degree than would otherwise be the case to the part of the section which is nearest to the thread.

I claim:

1. A self-locking nut having a body which is divided by means of two sets of opposed lateral grooves intersecting a substantial portion of the bore of the nut at right angles to each other to form three sections of substantially equal thickness, the middle section being connected with the lower section and the upper section by means of diametrically opposed members which are displaced at right angles with regard to each other and said nut having wrench flats throughout the periphery thereof.

2. A self-locking nut having a body which is divided by means of two sets of opposed lateral grooves intersecting a substantial portion of the bore of the nut at right angles to each other to form three sections of substantially equal thickness, the middle section being connected with the lower section and the upper section by means of diametrically opposed members which are displaced at right angles with regard to each other, said nut having wrench flats throughout the periphery thereof and an annular shoulder surrounding the threaded bore of said nut on the surface designed to engage the work.

FRITHJOF LEHRE.